(12) United States Patent
Godzaridis et al.

(10) Patent No.: US 11,017,594 B2
(45) Date of Patent: May 25, 2021

(54) LOCKING OF SPATIAL REGIONS OF LARGE-SCALE FULLY-CONNECTED MULTI-DIMENSIONAL SPATIAL DATA FOR COLLABORATIVE UPDATING

(71) Applicant: Bentley Systems, Incorporated, Exton, PA (US)

(72) Inventors: Elenie Godzaridis, Quebec (CA); Luc Robert, Valbonne (FR); Jean-Philippe Pons, Le Rouret (FR); Stephane Nullans, Saint Vallier de Thiey (FR)

(73) Assignee: Bentley Systems, Incorporated, Exton, PA (US)

( * ) Notice: Subject to any disclaimer, the term of this patent is extended or adjusted under 35 U.S.C. 154(b) by 0 days.

(21) Appl. No.: 16/440,178

(22) Filed: Jun. 13, 2019

(65) Prior Publication Data
US 2020/0357171 A1 Nov. 12, 2020

(30) Foreign Application Priority Data
May 6, 2019 (EP) ...................................... 19305577

(51) Int. Cl.
*G06T 17/20* (2006.01)
*G06T 7/11* (2017.01)
*G06T 19/20* (2011.01)

(52) U.S. Cl.
CPC ................ *G06T 17/20* (2013.01); *G06T 7/11* (2017.01); *G06T 19/20* (2013.01); *G06T 2210/12* (2013.01); *G06T 2210/36* (2013.01); *G06T 2219/004* (2013.01); *G06T 2219/024* (2013.01)

(58) Field of Classification Search
CPC . G06T 17/20; G06T 7/11; G06T 19/20; G06T 2210/12; G06T 2210/36; G06T 2219/004; G06T 2219/024; G06F 16/29; G06F 16/2343
See application file for complete search history.

(56) References Cited

U.S. PATENT DOCUMENTS

| 7,747,591 | B2 | 6/2010 | Chatterjee et al. | |
| 8,732,120 | B1* | 5/2014 | Barreirinhas | ........... G06F 16/29 |
| | | | | 707/608 |
| 10,255,716 | B1 | 4/2019 | Godzaridis et al. | |
| 10,255,720 | B1 | 4/2019 | Godzaridis et al. | |
| 2002/0065848 | A1* | 5/2002 | Walker | ................. G06F 40/166 |
| | | | | 715/205 |

(Continued)

OTHER PUBLICATIONS

Caradonna et al., Multi-image 3D Reconstruction: A Photogrammetric and Structure from Motion Comparative Analysis, 2018 (Year: 2018).*
Ganovelli, Fabio et al., "OCME: Out-Of-Core Mesh Editing Made Practical," IEEE, IEEE Computer Graphics and Applications, vol. 32, Issue 3, May 12, 2011, pp. 1-10.

(Continued)

*Primary Examiner* — Phong X Nguyen
(74) *Attorney, Agent, or Firm* — Cesari and McKenna, LLP; James A. Blanchette

(57) ABSTRACT

In an example embodiment, techniques are provided for locking a region of fully-connected large-scale multi-dimensional spatial data (e.g., a large-scale 3-D mesh) defined by a bounding box. A region is associated with a lock state (e.g., exclusive or sharable). Clients may access the fully-connected large-scale multi-dimensional spatial data based on a comparison of the bounding box of the requested spatial data to the bounding boxes of other client's locks and their lock state.

18 Claims, 11 Drawing Sheets

(56) References Cited

U.S. PATENT DOCUMENTS

| | | | |
|---|---|---|---|
| 2004/0177075 A1* | 9/2004 | Rangadass | G06F 16/178 |
| 2010/0174783 A1* | 7/2010 | Zarom | G06F 9/526 |
| | | | 709/205 |
| 2010/0268904 A1* | 10/2010 | Sheffield | G06F 3/0619 |
| | | | 711/163 |
| 2012/0069049 A1 | 3/2012 | Howe et al. | |
| 2012/0233555 A1* | 9/2012 | Psistakis | G06T 19/00 |
| | | | 715/751 |
| 2012/0320073 A1 | 12/2012 | Mason | |
| 2013/0135180 A1* | 5/2013 | McCulloch | G06Q 10/10 |
| | | | 345/8 |
| 2014/0317589 A1 | 10/2014 | Bowman, Jr. et al. | |
| 2015/0109296 A1 | 4/2015 | Panteleev et al. | |
| 2016/0092462 A1 | 3/2016 | Raj et al. | |
| 2017/0337215 A1* | 11/2017 | Bowman | G06F 16/1794 |
| 2019/0080520 A1 | 3/2019 | Godzaridis et al. | |
| 2019/0287306 A1* | 9/2019 | Wieser | G06F 3/1454 |
| 2019/0304175 A1* | 10/2019 | Maresch | G06T 1/0007 |
| 2020/0126309 A1* | 4/2020 | Moroze | G06T 19/20 |
| 2020/0132456 A1* | 4/2020 | Rzhanov | G01S 17/86 |

OTHER PUBLICATIONS

U.S. Appl. No. 16/514,585, filed Jul. 17, 2019 by Elenie Godzaridis et al. for Techniques for Concurrently Editing Fully Connected Large-Scale Multi-Dimensional Spatial Data, pp. 1-35.

Murray, Chuck, et al., "Oracle® Spatial and Graph," Developer's Guide, 12c Release 1 (12.1), E49172-07, Oracle, Jan. 2017, pp. 1-940.

"PostGIS 2.5.0 Manual," Sep. 23, 2018, pp. 1-857.

Van Oosterom, Peter, "Maintaining Consistent Topology Including Historical Data in a Large Spatial Database," Jan. 1997, pp. 327-336.

Xu, Xianghua, et al., "Distributed Dynamic-Locking in Real-Time Collaborative Editing Systems," Springer Nature Switzerland AG, Springer Link, International Conference on Collaboration and Technology, Groupware: Design, Implementation, and Use, Proceedings of the 10$^{th}$ International Workshop, CRIWG 2004, San Carlos, Costa Rica, Lecture Notes in Computer Science, vol. 3198. Springer-Verlag, Berlin, Heidelberg, Sep. 5-9, 2004, pp. 271-279.

"European Search Report and Written Opinion," European Application No. 19305577.9-123, Applicant: Elenie Godzaridis et al., dated Oct. 1, 2019, pp. 1-8.

* cited by examiner

133

| LOCK REGION | LOCK TYPE | EXPIRY DATE | LOCK USER # (default none) |
|---|---|---|---|
| min: (0,0,0) max: (1,1,1) | exclusive | 2019-01-25 12:42:00 | Alice |
| min: (1,1,1) max: (3,3,1) | shareable | 2019-01-01 00:00:00 | Bob |
| ... | ... | ... | ... |
|  |  |  |  |

FIG. 5

LOCKING OF SPATIAL REGIONS OF LARGE-SCALE FULLY-CONNECTED MULTI-DIMENSIONAL SPATIAL DATA FOR COLLABORATIVE UPDATING

RELATED APPLICATIONS

The present application claims the benefit of EP Patent Application No. 19305 577.9 titled LOCKING OF SPATIAL REGIONS OF FULLY-CONNECTED LARGE-SCALE MULTI-DIMENSIONAL SPATIAL DATA FOR COLLABORATIVE UPDATING, filed on May 6, 2019, the contents of which are incorporated herein in their entirety.

BACKGROUND

Technical Field

The present disclosure relates generally to accessing and editing multi-dimensional spatial data and more specifically to locking techniques applicable to fully-connected large-scale multi-dimensional spatial data to permit collaborative operation.

Background Information

It may be useful in a variety of software applications for multiple clients (e.g., software programs or human users) to collaboratively operate upon large-scale (e.g., potentially infinitely large) multi-dimensional (e.g., two-dimension (2-D), three-dimensional (3-D), four-dimensional (4-D), etc.) spatial data. Such collaborative operation may enable greater concurrency and parallelization of tasks and thereby efficiency, which may be especially important in processor intensive operations.

One type of software application that may benefit from collaborative operation is structure from motion (SfM) photogrammetry applications, such as the ContextCapture™ application available from Bentley Systems, Inc. A SfM photogrammetry application may operate to generate fully-connected large-scale multi-dimensional spatial data (e.g., a large-scale 3-D mesh) composed of faces (e.g., triangles) formed from vertices connected by edges, based on a set of images (e.g., photographs) of the real-world captured by a camera. The fully-connected large-scale multi-dimensional spatial data may be produced via reconstruction, texturing and annotation, and retouching. Reconstruction may involve several stages, including a draft reconstruction stage, refinement stage, and a simplification stage. Texturing and annotation may include a texturing stage that constructs textures to be shown on the faces and a pixel-level mapping stage that generates representations for non-visual data to be added to the data. Retouching may include editing the fully-connected large-scale multi-dimensional spatial data based on user-indicated changes to geometry and textures. In at least some of these stages, multiple clients (e.g., software programs operating in an automated manner or in response to user input) may access a current version of the fully-connected large-scale multi-dimensional spatial data (e.g., 3-D mesh) and perform discrete jobs, in order to distribute processing burden and achieve other benefits. While each client may perform its job independently, they may all contribute to the final version of the data.

Traditionally, to maintain consistency when allowing multiple clients to edit data, a locking strategy is provided. The purpose of a locking strategy is typically two-fold: first, to prevent simultaneously conflicting writes to the same data, that could not then be resolved, and, second, to make operations on different but related data atomic, so that a change to first data occurs as part of a same operation as a change to second data. However, existing locking strategies have a number of shortcomings when applied to fully-connected large-scale multi-dimensional spatial data such as a large-scale 3-D mesh.

Some locking strategies rely on tile boundaries. Tiles are predefined blobs of data (e.g., in the case of a 3-D mesh, blobs of vertex and edge data) that are typically created for memory optimization purposes. In a locking strategy that relies on tile boundaries, clients may be allowed to access different tiles provided they do not overlap or are not adjacent. By specifying that concurrently edited tiles are well separated, it may be ensured that changes made to one tile by a client do not influence other tiles being worked on by other clients. However, constraining clients to use specific tiles that are well separated may be inefficient. As mentioned above, tiles are typically created ahead of time for memory management purposes, not in response to the present needs of clients. Ideally, clients should be allowed or denied access to data depending upon whether their operations will affect consistency, not simply because the data is from the same or adjacent tiles. The reliance on tiles created for other purposes is restrictive and reduces possible concurrency. Such reduction in concurrency may hinder processing of large-scale large scale multi-dimensional spatial data on computing device(s), making such processing impractical or impossible given available hardware resources.

Other locking strategies may rely upon preexisting divisions of the data into individual, localized, units referred to as objects (e.g., in the case of a 3-D mesh, an object may be an individual 3D element). Object-based locking relies upon the data already being extensively structured, and knowledge of such structure is leveraged to allow concurrency. For example, clients may be allowed to edit different, well-separated objects. However, in some applications, such as when reconstructing fully-connected large-scale multi-dimensional spatial data (e.g., a 3-D mesh), this approach may prove impractical. Typically, the data may lack elaborate structure, or there may be little or no knowledge of structure. Ideally, clients should be permitted to work simultaneously even when there is not extensive underlying structure or there is no knowledge of underlying structure. Again, these limitations may hinder processing of large-scale large scale multi-dimensional spatial data on computing device(s), making such processing impractical or impossible.

Additional locking strategies have relied upon a file system of the computing device(s) storing the data. Certain operating systems may implement file-level locking to preserve atomicity. However, file-level locking is poorly suited for use with fully-connected large-scale multi-dimensional spatial data (e.g., a 3-D mesh). It is often desirable to store such data in a variety of files to attain desired performance, allow for efficient cache utilization and/or to maintain task independence on computing device(s). Such storage arrangements may not be well suited for file-level locking techniques, and thereby file-level locking may be impractical.

Still other locking strategies rely on row-level locking provided by a relational database management system (RDBMS) (e.g., SQL). The data is stored in a database, and individual items (e.g., edges) are each stored in their own database row. However, with fully-connected large-scale multi-dimensional spatial data (e.g., a 3-D mesh), there is often too many edges to store each of them in a database row given available hardware resources of computing device(s). Accordingly, traditional row-level locking may prove impractical or impossible.

Accordingly, there is a need for improved techniques for locking fully-connected large-scale multi-dimensional spatial data (e.g., a 3-D mesh) to permit collaborative operation

SUMMARY

Techniques are provided for locking a region of fully-connected large-scale multi-dimensional spatial data (e.g., a large-scale 3-D mesh) defined by a bounding box. A region is associated with a lock state (e.g., exclusive or sharable). Clients may access the data based on a comparison of a bounding box of the requested data to the bounding boxes of locks of other clients and their lock state.

In one embodiment, when a request is received by a process of a software application executing on one or more computing systems (e.g., an infinite mesh services process) from a first client for a lock on a first region (e.g., defined by a first bounding box that encompasses data to be edited by the first client), the process establishes a region-based lock (exclusive or sharable) on the region. When a request is received by the process for a lock (exclusive or sharable) on a second region of space represented in the multi-dimensional spatial data, the process compares the first region to the second region, and determines if they intersect. If so, and the first region-based lock is an exclusive lock, the process denies the request for the lock on the second region. If so, and the first region-based lock is a sharable lock and the second region-based lock is an exclusive lock, the process denies the request for the exclusive lock on the second region. If so, and the first region-based lock is a sharable lock and the second region-based lock is a sharable lock, the process grants the request for the sharable lock on the second region. If the first region and the second region do not intersect, the process may grant the second lock (exclusive or sharable).

Such a technique may have numerous advantages. Among other advantages, the efficiency it yields may permit collaborative operation on large-scale multi-dimensional spatial data where it proved impossible or impractical given the hardware resources of computing device(s).

It should be understood that a variety of additional features and alternative embodiments may be implemented other than those discussed in this Summary. This Summary is intended simply as a brief introduction to the reader for the further description that follows, and does not indicate or imply that the examples mentioned herein cover all aspects of the disclosure, or are necessary or essential aspects of the disclosure.

BRIEF DESCRIPTION OF THE DRAWINGS

The description refers to the accompanying drawings of example embodiments, of which:

FIG. 5 is a diagram illustrating an example region locking database;

DETAILED DESCRIPTION

Figure 1:
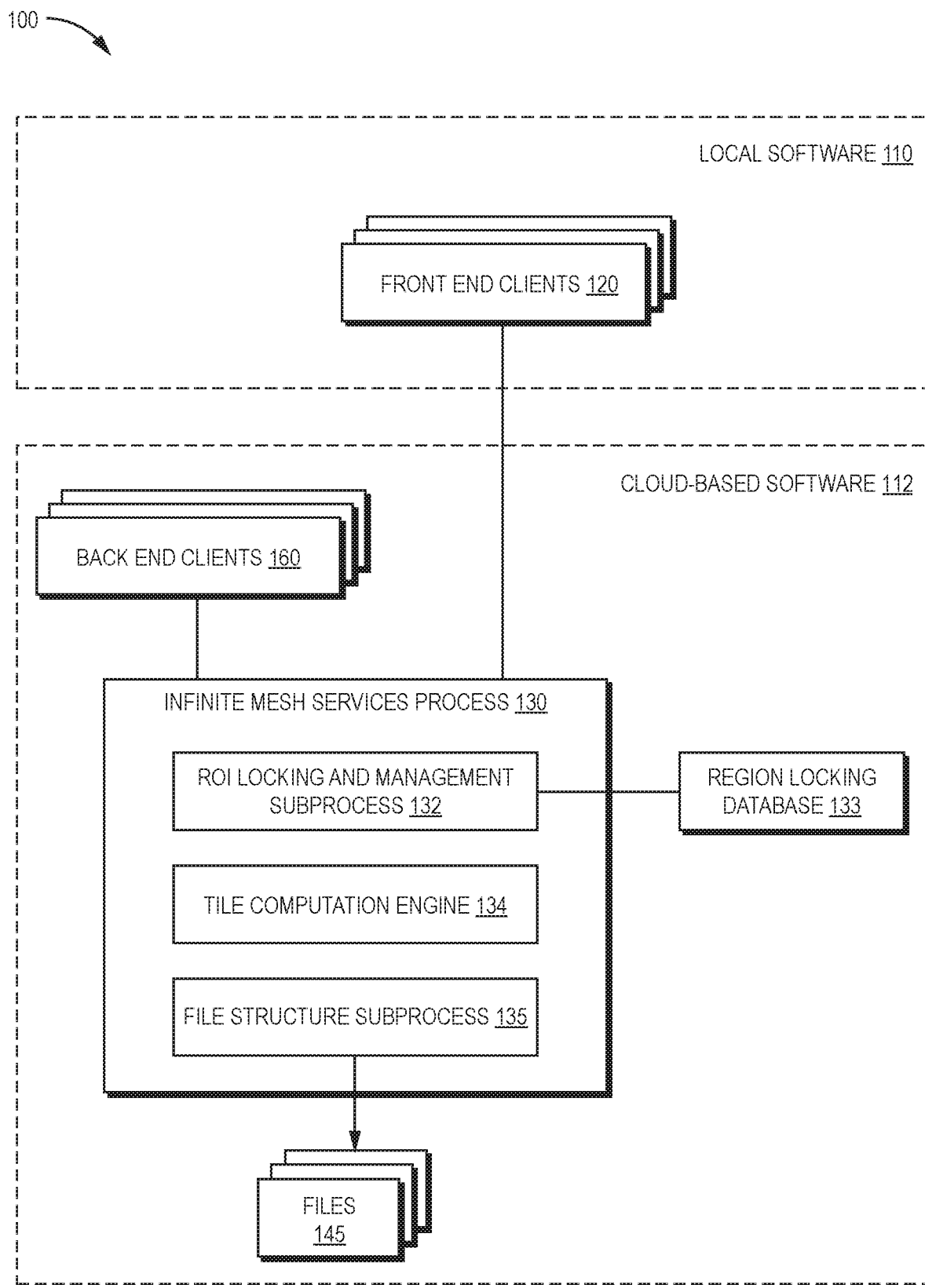
FIG. 1 is a high-level block diagram of an example software architecture for a SfM photogrammetry application that generates fully-connected large-scale multi-dimensional spatial data.

FIG. 1 is a high-level block diagram of an example software architecture 100 for a SfM photogrammetry application that generates fully-connected large-scale multi-dimensional spatial data. In an embodiment, where the fully-connected large-scale multi-dimensional spatial is a large-scale 3-D mesh, the dimensions may be height, width and depth. However, it should be understood that the data may have another numbers of dimensions and such dimensions may represent other information. For example, the data may be 4-dimensional data, with the fourth dimension representing time. In one embodiment, the SfM photogrammetry application operates to generate a large-scale 3-D mesh based on a set of images (e.g., photographs) of the real-world (source data) captured by a camera or cameras (not shown). The images (e.g., photographs) of the real-world may depict buildings, civil infrastructure, or other physical structures and/or terrain for which a 3-D mesh is desired. In addition images (e.g., photographs) of the real-world other forms of source data may additionally, or alternatively, be utilized. For example, source data may include data captured by LiDAR, RGB-D cameras, or other types of sensors depicting buildings, civil infrastructure, or other physical structures and/or terrain for which a 3-D mesh is desired. The sensors may be static, or mounted to mobile terrestrial or airborne platforms.

The software architecture 100 may be divided into local software 110 that executes on one or more computing devices local to an end-user (collectively "local devices") and cloud-based software 112 that is executed on one or more computing devices remote from the end-user (collectively "cloud computing devices"), accessible via a network (e.g., the Internet). Each computing device may include processors, memory, storage systems, and other hardware (not shown). The local software 110 may include frontend clients 120 each operating on different local devices that provide a user-interface to the SfM photogrammetry application. The frontend clients 120 may display the fully-connected large-scale multi-dimensional spatial data (e.g., 3-D mesh) and perform retouching operations in response to user input. The cloud-based software 112 may include backend clients 160 that perform reconstruction, texturing and annotating operations, as well as other processing intensive operations. To improve performance, the backend clients 160 may each be executed on different cloud computing devices. In some cases, the backend clients 160 may be executed as different threads, such that they operate independently even when executed on the same cloud computing device. The frontend clients 120 and backend client 160 (collectively "clients") may operate concurrently, with multiple clients 120, 160 editing portions of the multi-dimensional spatial data (e.g., 3D mesh) in parallel.

An infinite mesh services process 130 functionally organizes the SfM photogrammetry application and provides access to the fully-connected large-scale multi-dimensional spatial data (e.g., large-scale 3D mesh) to clients 120, 160. The fully-connected large-scale multi-dimensional spatial data may be organized as tiles maintained in files 145. Such storage may be structured according to any of a number of data structures. In one implementation, the data structure may take the form of an ambient octree.

The infinite mesh services process 130 may manage reading and writing to the multi-dimensional spatial data by the clients 120, 160 to permit them to perform their respective operations. Access that involves reading alone may be conducted in a "read-only" mode without having to acquire a lock. Access that involves writing typically will require the client 120, 160 to obtain a lock. Locks may be of multiple different types, depending on the nature of the operations to be performed by the client 120, 160. The types may include exclusive locks, where the client has exclusive access to write to the multi-dimensional spatial data, such that no other client can write to it while the lock is ongoing; and sharable locks, where the client has access to write to the multi-dimensional spatial data and other clients are also permitted access to write to the data (with changes being merged), but are prevented from obtaining exclusive access.

While some client operations on the multi-dimensional spatial data may naturally coincide with object or tile boundaries, other client operations may not coincide with such boundaries. Accordingly, locking strategies based solely thereupon may be inadequate or inefficient. As discussed below, region-based locks may address this issue.

The infinite mesh services process 130 may include a number of subprocesses that are used in connection with region-based locks. A region of interest (ROI) locking and management subprocess 132 that may maintain a region locking database 133. A tile computation engine 134 may automatically compute, address and update tiles when regions are locked or writes committed. Further, a file structure subprocess 135 may organize data of tiles for storage into respective files 145. It should be understood that the infinite mesh services process 130 may also include a large number of other subprocesses, and that these specific subprocess are only mentioned herein for purposes of illustration.

Figure 2:
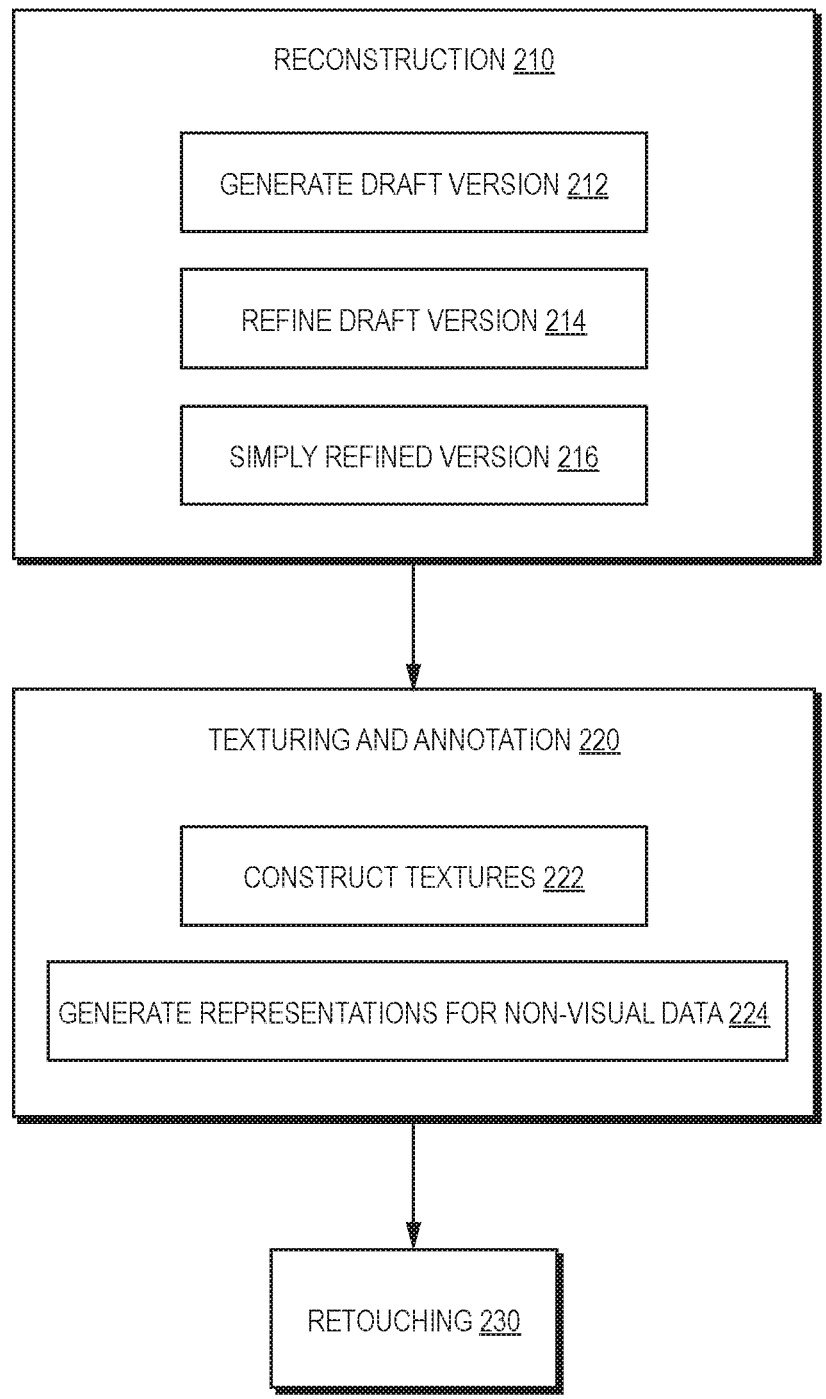
FIG. 2 is a flow diagram of a sequence of steps for generation of fully-connected large-scale multi-dimensional spatial data that may be performed by clients under the organization of an infinite mesh services process of the SfM photogrammetry application.

FIG. 2 is a flow diagram of a sequence of steps for generation of fully-connected large-scale multi-dimensional spatial data (e.g., a 3-D mesh) that may be performed by the clients 120, 160 under the organization of the infinite mesh services process 130 of the SfM photogrammetry. As discussed above, the source data may include a set of images (e.g., photographs) of the real-world captured by a camera, and additionally, or alternatively, LiDAR, RGB-D cameras, or other types of sensors. At step 210, one or more backend clients 160 may perform reconstruction operations on the source data. As part of reconstruction, at sub-step 212, a surface generation/draft reconstruction sub-process generates a draft version of triangulated surfaces. Draft reconstruction may be performed by an algorithm such as Floating-Scale Surface Reconstruction that reconstructs discrete parts of the surface in parallel. Likewise, at sub-step 214, a surface evolution/refinement sub-process refines the draft version to produce refined triangulated surfaces. The surface may be refined in parts. Further, at sub-step 216, a simplification sub-process simplifies the refined triangulated surfaces to eliminate faces that do not meaningfully contribute. Simplification may also be performed in parts. At step 220, one or more backend clients 160 may perform texturing and annotation operations to map data to a surface of the fully-connected large-scale multi-dimensional spatial data (e.g., 3-D mesh) using location and local surface information. As part of texturing and annotation, at sub-step 222, a texturing sub-process constructs textures to be shown on a surface using the set of images and/or other real-world data and image filtering or rebalancing algorithms. Likewise, at sub-step 224, a pixel-level mapping sub-process generates representations for non-visual data (e.g., environmental data such as temperature data, resolution data, etc.) to be added. At step 230, one or more frontend clients 120 may perform retouching operations to edit the fully-connected large-scale multi-dimensional spatial data based on user-indicated changes to geometry and textures.

During the sequence of steps, efficiency may be increased by having multiple clients 120, 160 concurrently perform operations, such that different parts are edited in parallel. While traditional locking strategies (e.g., based on files, objects, etc.) may be utilized in some steps, they are unsuited for others. For example, during the surface generation/draft reconstruction of step 212 and the retouching of step 230, the clients 120, 160 may make permeant edits to the structure of the fully-connected large-scale multi-dimensional spatial data (e.g., 3-D mesh) in ways that are not known or limited prior to the edits. The clients may not know how the data is maintained in files 145, and may not be certain of object structure. However, it is generally known that modifications are limited to a specific portion of space and thereby region-based locking may be utilized to permit concurrency in such steps.

Figure 3A:
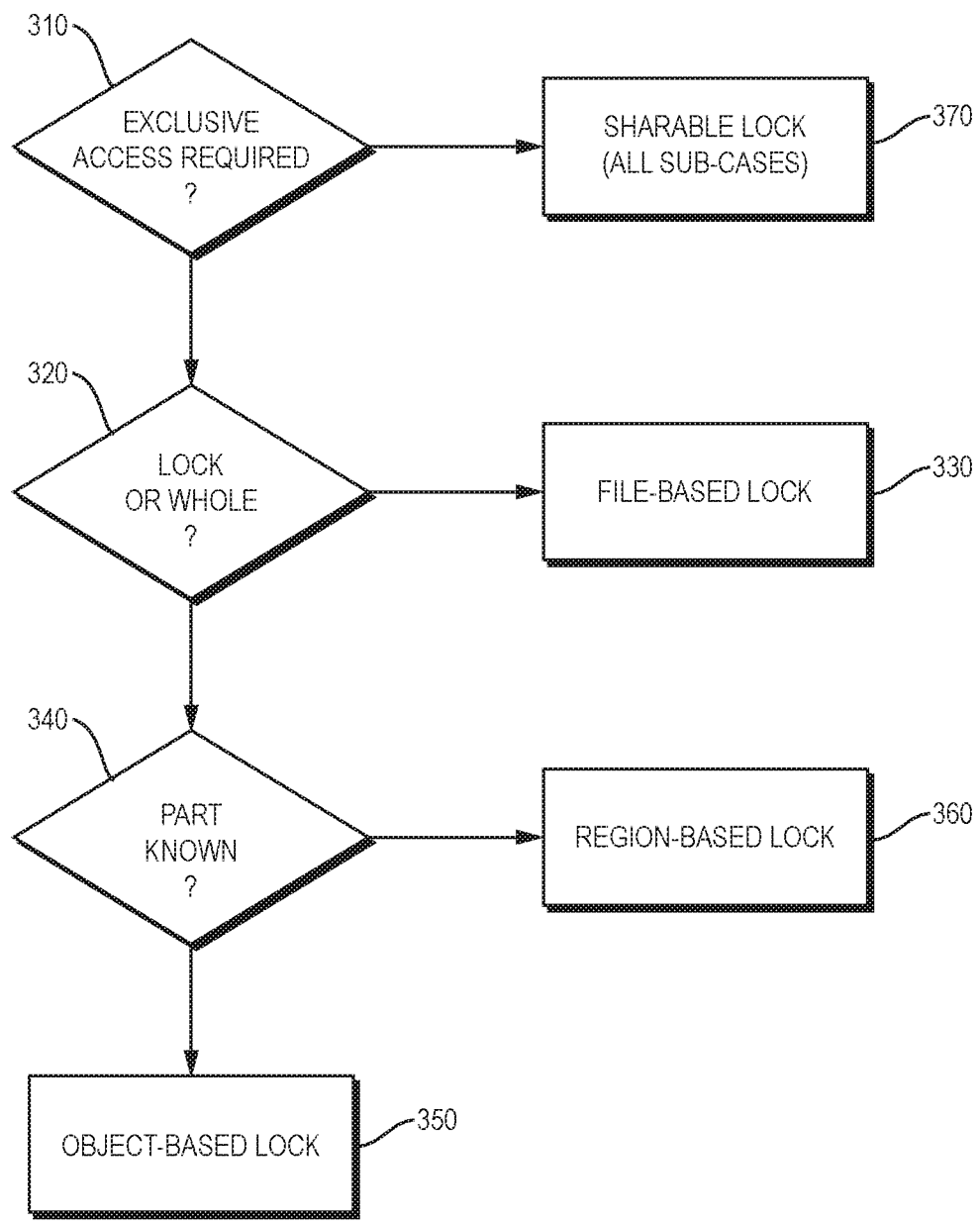
FIG. 3A is a flow diagram of a sequence of steps illustrating conventional file-based and object-based locking of fully-connected large-scale multi-dimensional spatial data and new region-base locking.

FIG. 3A is a flow diagram of a sequence of steps illustrating conventional file-based and object-based locking of fully-connected large-scale multi-dimensional spatial data (e.g., a 3-D mesh) and new region-base locking. At step 310, the infinite mesh services process 130 determines whether a client 120, 160 requires exclusive access to write to the data. If so, at step 320, the infinite mesh services process 130 determines whether the client 120, 160 requires the access to be for the entire data or an entire file thereof (referred to collectively as the "whole" data), or only requires the access for part of the data or part of a file thereof (referred to collectively as "part" of the data). If the whole data is required, execution proceeds to step 330, where the file structure subprocess 135 performs conventional file-based locking. If not, execution proceeds to step 340, where the infinite mesh services process 130 determines whether the part of the data is known by a pre-existing object. If so, execution proceeds to step 350, where the infinite mesh services process 130 performs conventional object-based locking. If not, execution proceeds to step 360, where the ROI locking and management subprocess 132 implements a region-based lock.

Returning to step 310, if the client does not require exclusive access to write to the fully-connected large-scale multi-dimensional spatial data, execution proceeds to 370 where the process 130 implements a sharable lock. The sharable lock may be file-based, object-based, or region-based, depending upon the data requirements.

Figure 3B:
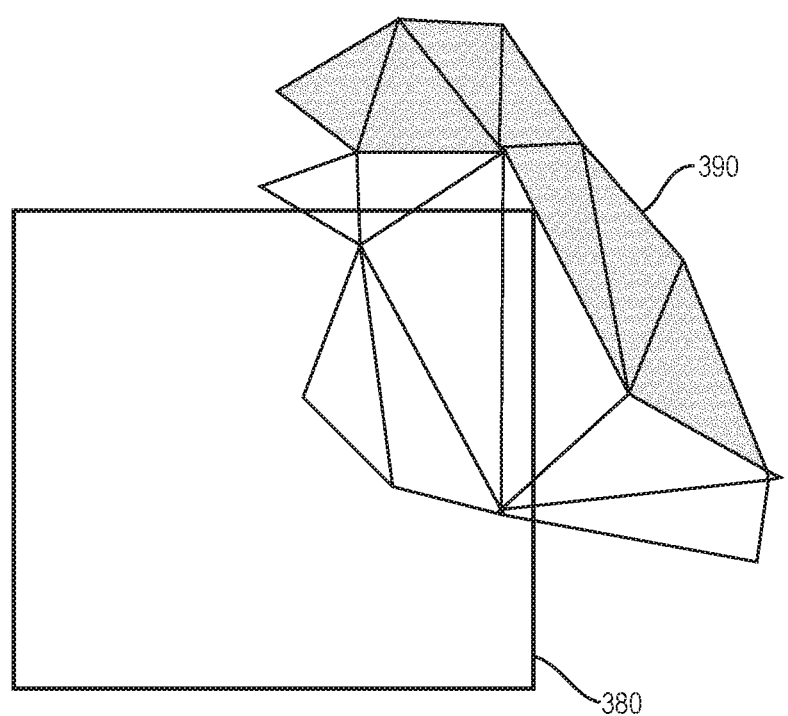
FIG. 3B is a diagram illustrating an example region-based lock on a region of a 3D mesh and marking of a boundary as read-only.

A region-based lock may be defined by a bounding box that encompasses the portion in space of the fully-connected large-scale multi-dimensional spatial data (e.g., 3-D mesh) to be written to. In the case where the multi-dimensional spatial data is a 3D mesh, the bounding box may encompass a set of vertices and edges. When access is provided to a client 120, 130, a boundary (e.g., composed of faces and vertices) immediately surrounding the bounding box may be marked as read-only. Such read-only marking may inform the client of portions of the data that cannot be changed. FIG. 3B is a diagram illustrating an example region-based lock on a region 380 of a 3D mesh and marking of a boundary as read-only. The entire 3D mesh shown may be accessed by a client 120, 160. The shaded faces 390, however, may be marked read-only.

After a client 120, 160 has successfully obtained a lock, and has committed a change, the infinite mesh services process 130 may perform a check to verify that the lock has not expired and that the change preserves the boundary immediately surrounding the region. If so, the client's changes are accepted and written to the files 145. If not, the changes are denied. If two client 120, 160 request a region-based lock on intersecting regions, the later in time region-based lock is accepted if both region-based locks are of the sharable type and denied if either of the region-based locks is of the exclusive type. If the two region-based locks are sharable, changes may be written sequentially, with the infinite mesh services process 130 attempting to merge later changes. If merging fails (e.g., in the case of a 3D mesh because both clients are attempting to change the same vertices) an error may be returned.

Region-based locks may be used to ensure atomicity of changes, as well as consistency of data. In some embodiments, region-based locks may be used in an implicit manner, so that a region is at least sharably locked whenever a client requests access, even for read-only access.

Figure 4:
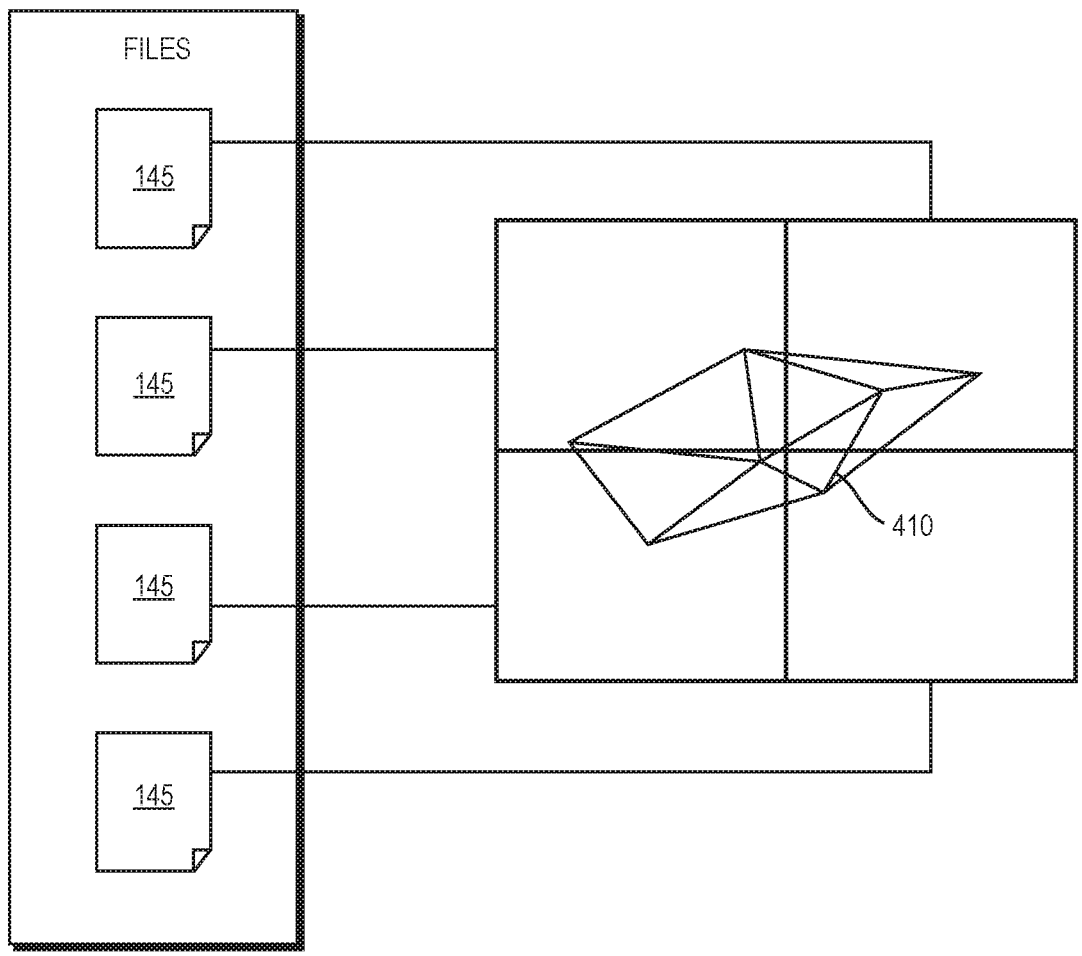
FIG. 4 is a diagram illustrating an example 3-D mesh object that is referred to repeatedly in FIGS. 5-10.

To facilitate understanding of region-based locking, example multi-dimensional spatial data (e.g., an example 3-D mesh) may be considered and referred to in various use cases. FIG. 4 is a diagram illustrating an example 3-D mesh object 410 that is referred to repeatedly in FIGS. 5-10. The 3-D mesh object 410 may be a portion of a much larger 3-D mesh that is not shown. The 3-D mesh object 410 may be divided spatially and each portion stored in different files 145 coinciding with tiles.

Likewise, to facilitate understanding of region-based locking, an example region locking database 133 that may be maintained by the ROI locking and management subprocess 132 may be considered. FIG. 5 is a diagram illustrating an example region locking database 133. A database 133 may be maintained for each object of the multi-dimensional spatial data (e.g., an example 3-D mesh) indicating all region-based locks that are currently active on it, separate from the files 145 that store the data. The database 133 may include a number of rows that represent individual region-based locks, and columns that describe characteristics of the region-based locks. The characteristics may include a lock region 510 that defines a bounding box in multi-dimensional space. In one embodiment, the bounding box is described by coordinates (e.g., Cartesian coordinates in the case of a 3D mesh) that define a minimum and maximum extent of the bounding box. However, it should be understood that the bounding box may be described in other manners. The characteristics may also include a lock type 520, such as sharable or exclusive. Likewise, an expiration date 530 may be included. The expiration date may have a default value (e.g., +5 minutes) or be set to a custom value. Inclusion of an expiration date may prevent deadlocking. Past the expiration date other locks may be allowed on the regions, and the expired lock will longer permit a client to commit updates. The expiration date may be renewed if more time is needed by the client. Renewals may be limited to a maximum period (e.g., +2 hours at a time). The characteristics may also include a lock user 540 that identifies the client 120, 160 that has placed the lock on the region. In the case of a frontend client, the lock user may be the name of a human user of the client 120. By default, the lock user 540 may be left blank.

Figure 6:
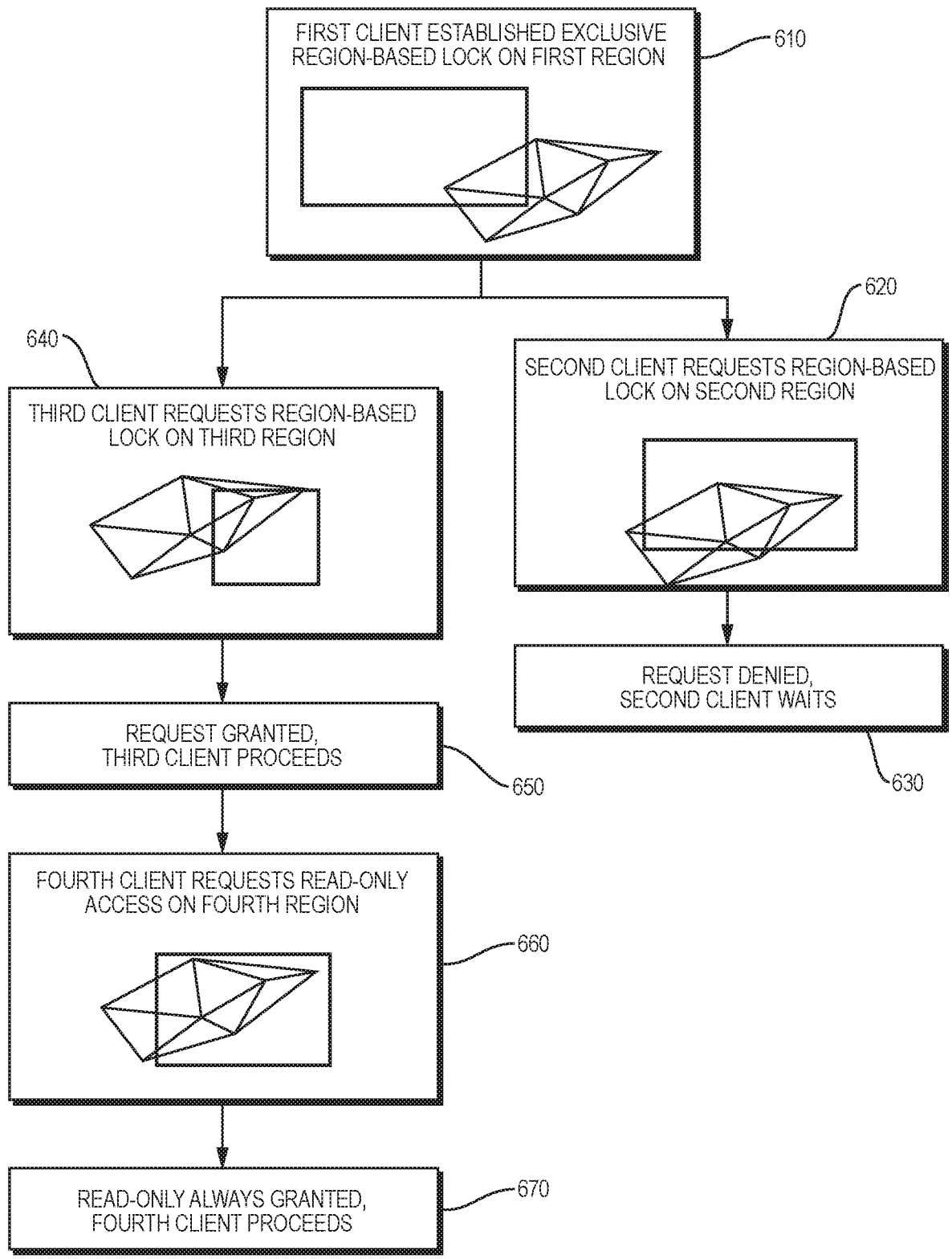
FIG. 6 is a flow diagram of example use of an exclusive region-based lock, which illustrates denial of subsequent conflicting locks.

FIG. 6 is a flow diagram of example use of an exclusive region-based lock, which illustrates denial of subsequent conflicting locks. At step 610, which represent a preexisting state, a first client has established an exclusive region-based lock on a first region defined by a first bounding box. At step 620, a second client requests an exclusive or sharable region-based lock on a second region defined by a second bounding box, to be permitted to write to the 3-D mesh within such region. Since the second bounding box intersects the first bounding box of the existing region-based lock, the second client's request is denied, and, at step 630, the second client is directed to wait until the first client's lock is released, expires or the request times out. At step 640, a third client requests an exclusive or sharable region-based lock on a third region defined by a third bounding box to be permitted to update the 3-D mesh within such region. Since the third bounding box does not intersect the first bounding box of the existing region-based lock, the third client's exclusive region-based lock is granted. At step 650, the third client is directed to proceed. At step 660, a fourth client requests read-only access to a fourth region defined by a fourth bounding box. In the case of read-only access, there is no need for a lock and the request is granted at step 670.

Figure 7:
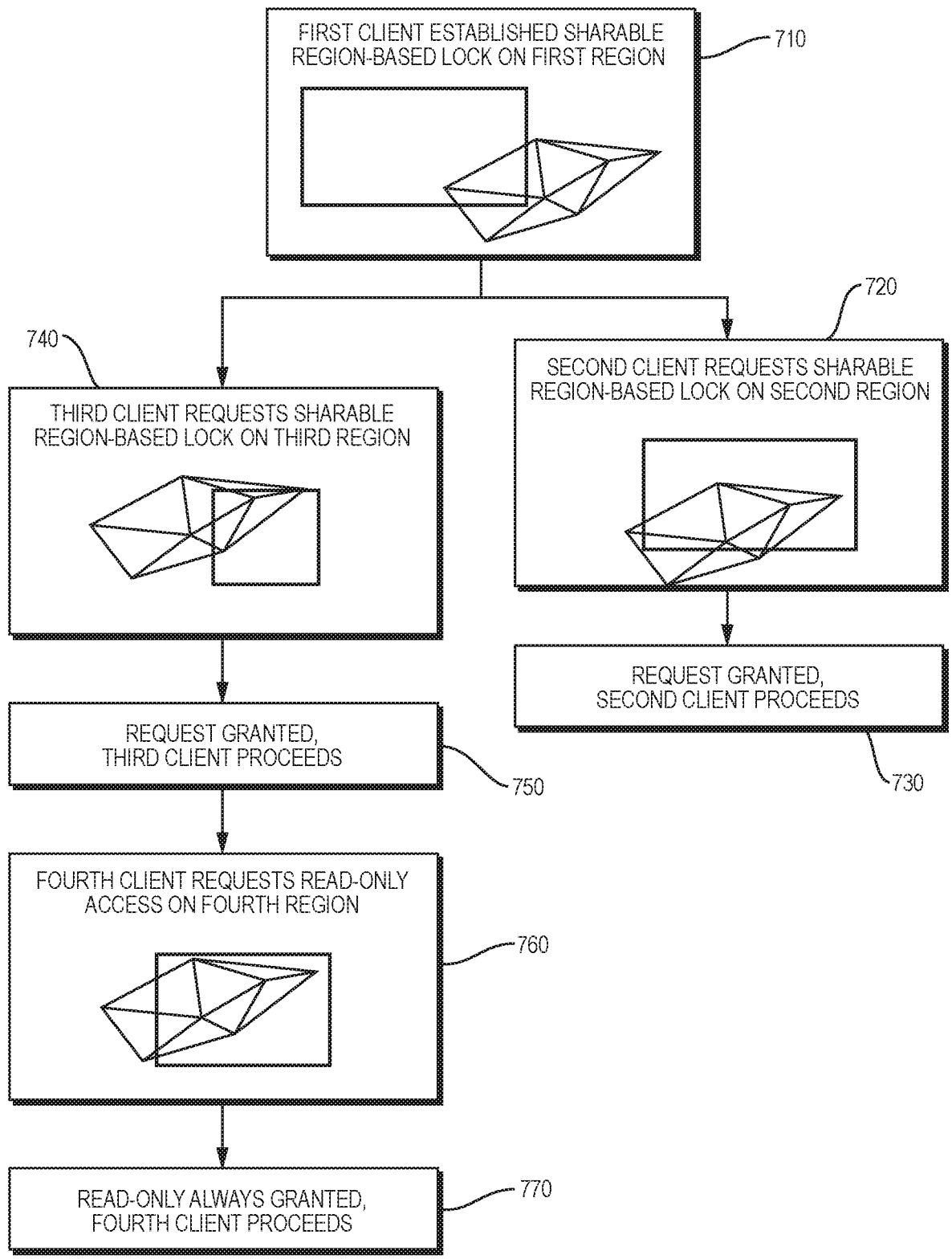
FIG. 7 is a flow diagram of example of use of a sharable region-based lock, which illustrates granting of subsequent sharable region-based locks.

FIG. 7 is a flow diagram of example use of a sharable region-based lock, which illustrates granting of subsequent sharable region-based locks. At step 710, which represents a preexisting state, a first client has established a sharable region-based lock on a first region defined by a first bounding box. At step 720, a second client requests a sharable region-based lock on a second region defined by a second bounding box. Even though the second bounding box intersects the first bounding box of the existing sharable region-based lock, since both are sharable the second client's region-based lock is granted, and at step 730, the second client is directed to proceed. At step 740, a third client requests a sharable region-based lock on a third region defined by a third bounding box. Since the third bounding box does not intersect the first bounding box of the existing sharable region-based lock, the third client's sharable region-based lock is granted. At step 750, the third client is directed to proceed. At step 760, a fourth client requests read-only access to a fourth region defined by a fourth bounding box. In the case of read-only access, there is no need for a lock and the request is granted at step 770.

Figure 8:
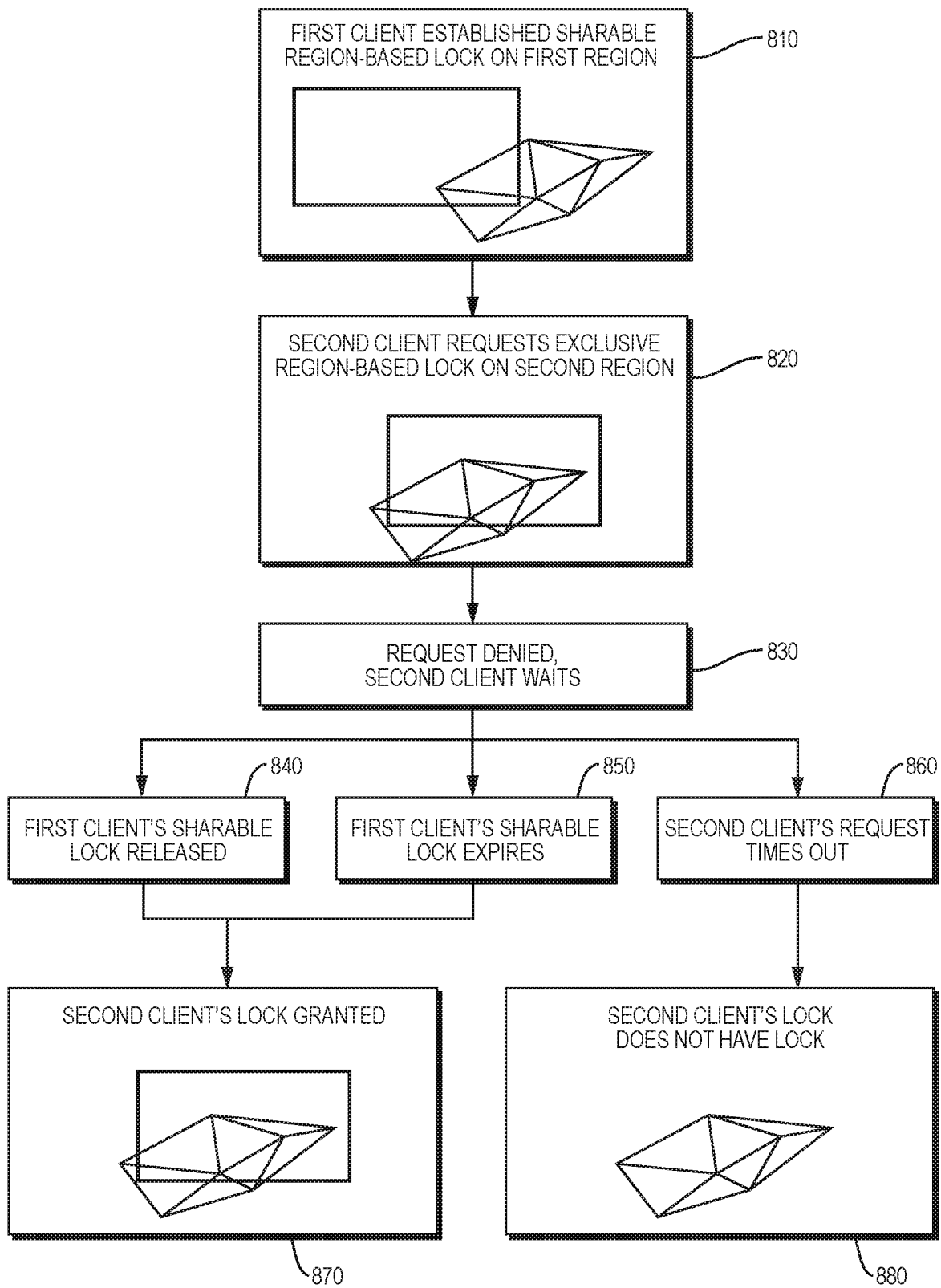
FIG. 8 is a flow diagram of example use of a sharable region-based lock, which illustrates denial of subsequent exclusive region-based locks.

FIG. 8 is a flow diagram of example use of a sharable region-based lock, which illustrates denial of subsequent exclusive region-based locks. At step 810, which represents a preexisting state, a first client has established a sharable region-based lock on a first region defined by a first bounding box. At step 820, a second client requests an exclusive region-based lock on a second region defined by a second bounding box. The second bounding box intersects the first bounding box of the existing sharable region-based lock. Since exclusive and sharable locks are incompatible, at step

830, the second client is directed to wait until the first client's lock is released, expires or the request times out. The choice of these options may depend upon time of occurrence or other factors. For example, at step 840, if the first client releases its sharable region-based lock first, execution may proceed to step 870 where the second client's exclusive region-based lock is granted. Alternatively, at step 850, if the first client's sharable region-based expires first (based on its expiration date), execution may proceed to step 870 where second client's exclusive region-based lock is granted. In still another alternative, at step 860, if a timeout period associated with the second client's request is reached before the first client's sharable region-based is released or expires, the second does not obtain a lock at step 880.

Figure 9:
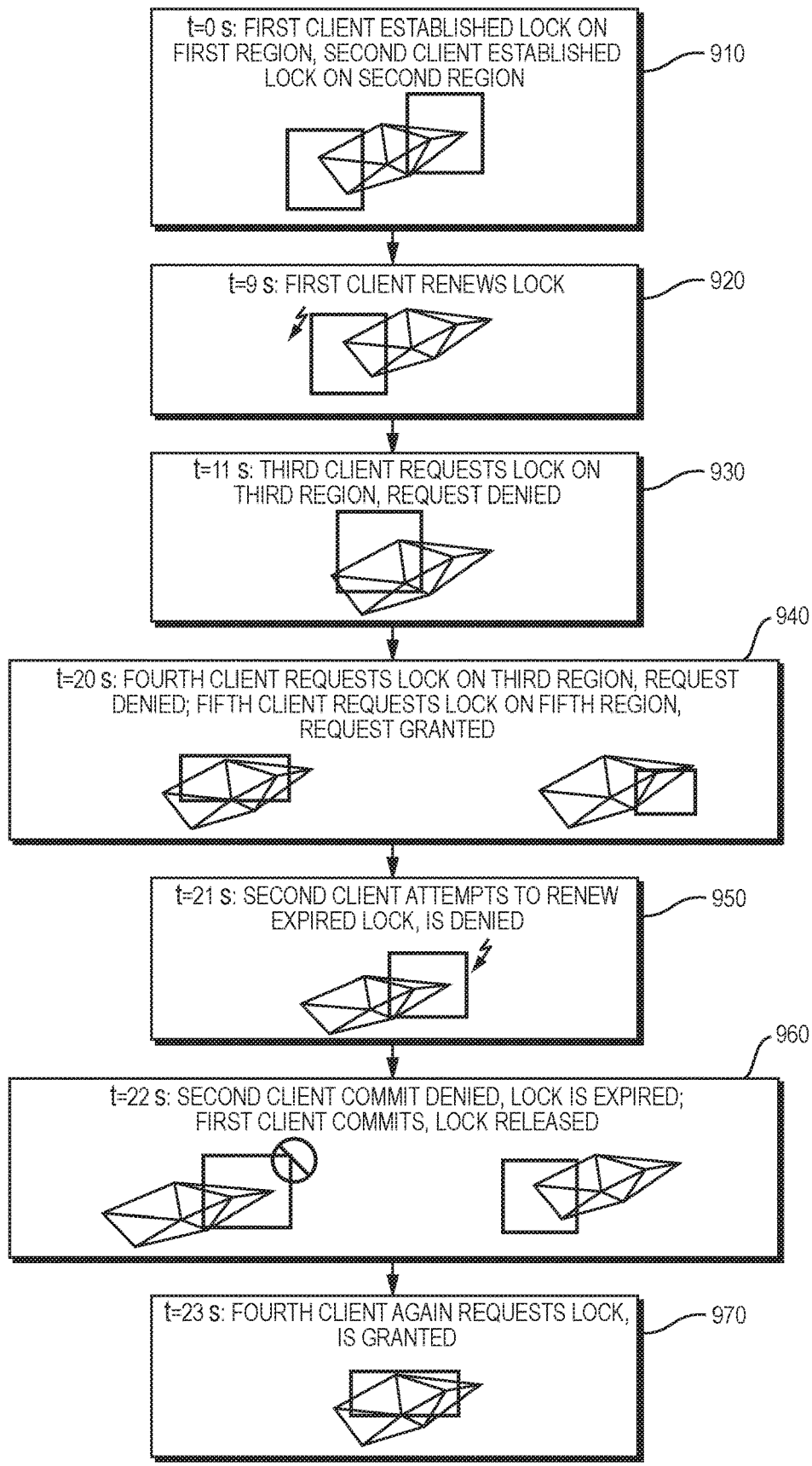
FIG. 9 is a flow diagram of example expirations and renewals of region-based locks, which illustrates the effects thereof on other locks.

As indicated above, region-based locks may automatically expire when their expiration date are reached, or be explicitly released by a client. Before expiration or release, region-based locks may also be renewed to extend their expiration date. FIG. 9 is a flow diagram of example expirations and renewals of region-based locks, which illustrates the effects thereof on other locks. At step 910, at time (t)=0 seconds (s), which represents a pre-existing condition, a first client has an exclusive region-based lock on a first region defined by a first bounding box and a second client has an exclusive region-based lock on a second region defined by a second bounding box. The first client's lock expires at t=10 s and the second client's lock expires at t=20 s, based on their respective expiration dates. At step 920, at time t=9 s, the first client renews its lock for 15 s. At step 930, at time t=11 s, a third client second client requests an exclusive region-based lock on a third region defined by a third bounding box. Since the third region intersects the first region of the first client's region-based lock that was renewed, the third client's request is denied. At step 940, at time t=20 s, a fourth client requests an exclusive region-based lock on a fourth region defined by a fourth bounding box and a fifth client requests an exclusive region-based lock on a fifth region defined by a fifth bounding box. Since the fourth region intersects the first region of the first client's region-based lock that was renewed, the fourth client's request is denied. However, even though the fourth region would intersect the second region of the second client's region-based lock, since the second client's lock has expired, the fifth client's request is granted. At step 950, at time t=21 s, the second client attempts to renew its now-expired exclusive region-based lock, but is denied because its lock already has expired and would now conflict with the fifth client's exclusive region-based lock. At step 960, at time t=22 s, the second client attempts to commit changes and unlock the second region, but is denied because its lock has already expired. Also, the first client attempts to commit changes and unlock the first region, which is accepted and successfully executed. At step 770, at t=23 s the fourth client whose request for an exclusive region-based lock was denied at step 945 retries requesting the lock and it is now granted since the second client's lock on the second region defined has expired and the first client has unlocked the first region.

Figure 10:
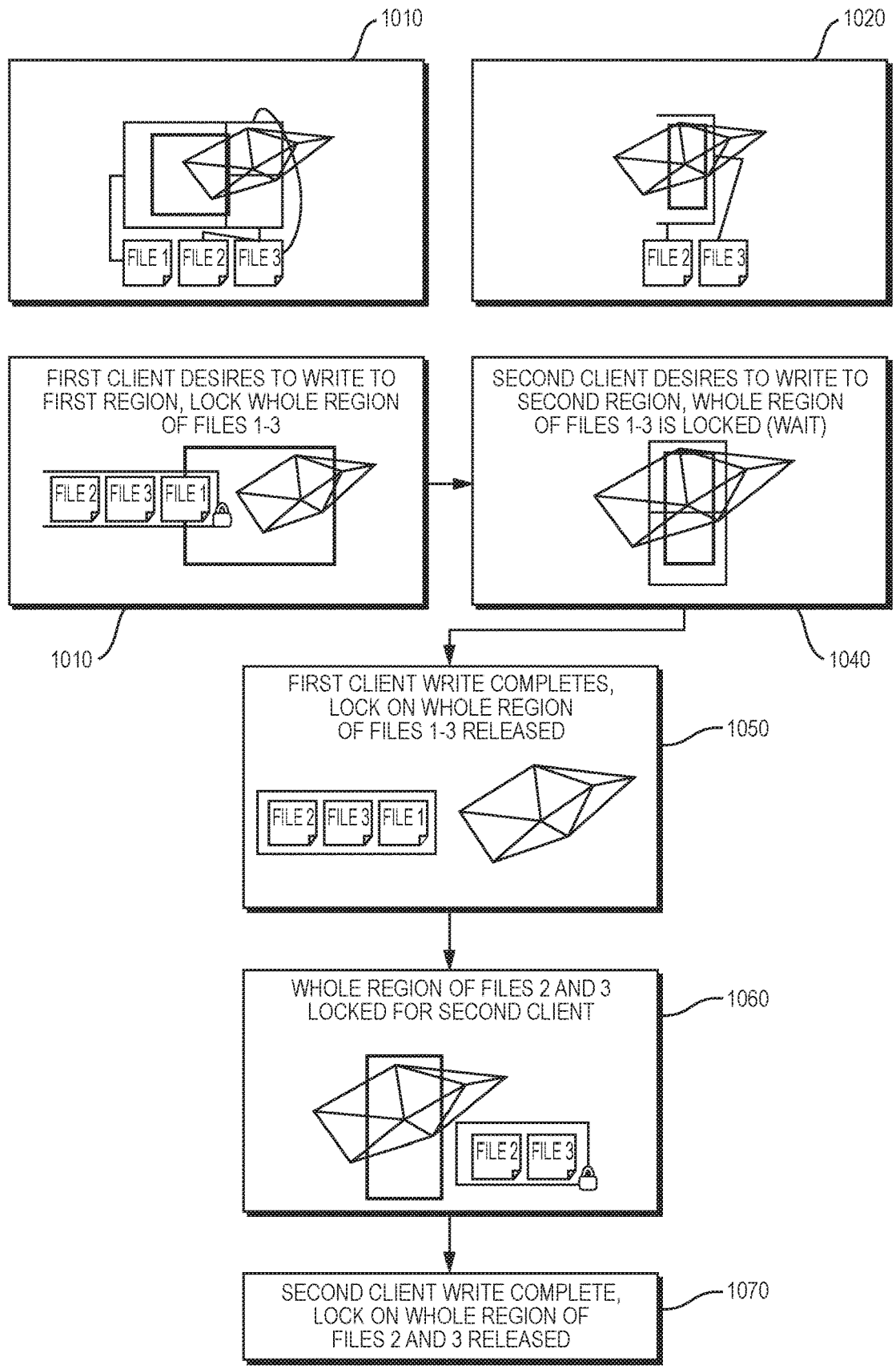
FIG. 10 is a flow diagram of example use of region-based locks to support atomic editing of files.

Region-based locks can be used to support atomic editing of files 145 that store multi-dimensional data for a region, to prevent chimeric application of changes by various clients 120, 160. FIG. 10 is a flow diagram of example use of region-based locks to support atomic editing of files 145. In this example, a first region that a first client desires to write to covers a portion of the multi-dimensional space covered by file 1 and a portion of the multi-dimensional space covered by files 2 and 3, as shown in block 1010. A second region covers a portion of the multi-dimensional space covered by files 2 and file 3, as shown in block 1020. At step 1030, a first client attempts to write to the first region. Since the write to the first region impacts files 1-3, a lock is automatically applied to the whole region covered by files 1-3 to prevent chimeric application of changes, and the first client proceeds to write to the first region. At step 1040, a second client attempts to write to the second region. Since the write to the second region impacts files 2 and 3, and there is an existing lock on the whole region covered by files 1-3, the second client is directed to wait. At step 1050, the first client completes its write to the first region and the lock on the whole region covered by files 1-3 is released. At step 1060, the second client is granted a lock to the whole region covered by files 2 and 3 proceeds to write to the second region. At step 1070, the second client completes its write to the second region and the lock on the whole region covered by files 2 and 3 is released. Since the time taken to perform a write is predictable, region-based locks used to sequence writes to files 145 are not expected to time out.

It should be understood that various adaptations and modifications may be readily made to what is described above, to suit various implementations and environments. While it is discussed above that many aspects of the techniques may be implemented by specific software processes (e.g., of an application stored in a non-transitory electronic device readable medium for execution on one or more processors) or on specific hardware devices, it should be understood that some or all of the techniques may also be implemented by different software on different hardware. In addition to general-purpose computing devices/electronic devices, the hardware may include specially configured logic circuits and/or other types of hardware components. Above all, it should be understood that the above descriptions are meant to be taken only by way of example.

What is claimed is:

1. A method for locking multi-dimensional spatial data stored in one or more files, comprising:
   receiving, by a process of a software application executing on one or more computing systems, a request from a first client for a region-based lock on a first region of space represented in the multi-dimensional spatial data;
   establishing the region-based lock on the first region, wherein the establishing includes marking a boundary in the space immediately surrounding the first region as read-only;
   permitting the first client to write to the multi-dimensional spatial data within the first region;
   receiving, by the process of the software application, a request from a second client for a region-based lock on a second region of space represented in the multi-dimensional spatial data;
   comparing the first region to the second region; and
   in response to whether the first region and the second region intersect, either denying the request for the region-based lock on the second region and preventing the second client from writing to the multi-dimensional spatial data within the second region, or granting the request for the region-based lock on the second region and allowing the second client to write to the multi-dimensional spatial data within the second region.

2. The method of claim 1, wherein the first region is defined by a first bounding box that encompasses data to be written to by the first client and the second region is defined by a second bounding box that encompasses data to be written by the second client.

3. The method of claim 1, wherein the region-based lock on the first region is an exclusive lock, the region-based lock on the second region is an exclusive or sharable lock, and in response to the first region and the second region intersecting, denying the request for the exclusive or sharable lock on the second region and preventing the second client from writing to the multi-dimensional spatial data within the second region, and in response to the first region and the second region not intersecting, granting the request for the exclusive or sharable lock on the second region and allowing the second client to write to the multi-dimensional spatial data within the second region.

4. The method of claim 1, wherein the region-based lock on the first region is a sharable lock, the region-based lock on the second region is an exclusive lock, and in response to the first region and the second region intersecting, denying the request for the exclusive lock on the second region and preventing the second client from writing to the multi-dimensional spatial data within the second region, and in response to the first region and the second region not intersecting, granting the request for the exclusive lock on the second region and allowing the second client to write to the multi-dimensional spatial data within the second region.

5. The method of claim 1, wherein the region-based lock on the first region is a sharable lock, the region-based lock on the second region is a sharable lock, and in response to the first region and the second region intersecting, granting the request for the sharable lock on the second region and allowing the second client to write to the multi-dimensional spatial data within the second region, and in response to the first region and the second region not intersecting, granting the request for the sharable lock on the second region and allowing the second client to write to the multi-dimensional spatial data within the second region.

6. The method of claim 1, wherein the permitting the first client to write to the multi-dimensional spatial data within the first region further comprises:
performing a check to verify that the region-based lock on the first region has not expired.

7. The method of claim 1, wherein the multi-dimensional spatial data is a three dimension (3-D) mesh.

8. The method of claim 7, wherein the software application is a structure from motion (SfM) photogrammetry application that generates the 3-D mesh based on a set of images of the real-world captured by a camera, and the first client and the second client perform retouching, reconstruction, texturing or annotating operations upon the 3-D mesh.

9. A computing device comprising:
a processor; and
a memory coupled to the processor and configured to store a three-dimensional (3-D) mesh and a process of a structure from motion (SfM) photogrammetry application, the process of the SfM photogrammetry application when executed operable to:
receive a request from a first client that is configured to perform retouching, reconstruction, texturing or annotating operations upon the 3-D mesh for a region-based lock on a first region of space of the 3-D mesh,
establish the region-based lock on the first region, wherein the region-based lock on the first region provides that a boundary in the space immediately surrounding the first region is marked as read-only,
permit the first client to write to the 3-D mesh within the first region,
receive a request from a second client that is configured to perform retouching, reconstruction, texturing or annotating operations upon the 3-D mesh for a region-based lock on a second region of space of the 3-D mesh,
compare the first region to the second region, and
in response to whether the first region and the second region intersect, either deny the request for the region-based lock on the second region and prevent the second client from writing to the 3-D mesh within the second region, or grant the request for the region-based lock on the second region and allow the second client to write to the 3-D mesh within the second region.

10. The computing device of claim 9, wherein the first region is defined by a first bounding box that encompasses data to be written to by the first client and the second region is defined by a second bounding box that encompasses data to be written by the second client.

11. A non-transitory electronic-device readable medium having instructions stored thereon, the instructions when executed by one or more electronic devices operable to:
receive a request from a first client for a region-based lock on a first region of space represented in multi-dimensional spatial data;
establish the region-based lock on the first region, wherein the region-based lock on the first region provides that a boundary in the space immediately surrounding the first region is marked as read-only;
receive a request from a second client for a region-based lock on a second region of space represented in the multi-dimensional spatial data;
compare the first region to the second region; and
in response to whether the first region and the second region intersect, either deny the request for the region-based lock on the second region, or grant the request for the region-based lock on the second region.

12. The non-transitory electronic-device readable medium of claim 11, wherein the first region is defined by a first bounding box that encompasses data to be written to by the first client and the second region is defined by a second bounding box that encompasses data to be written by the second client.

13. The non-transitory electronic-device readable medium of claim 11, wherein the region-based lock on the first region is an exclusive lock, the region-based lock on the second region is an exclusive or sharable lock, and the instructions operable to either deny or grant are operable to, in response to the first region and the second region intersecting, deny the request for the exclusive or sharable lock on the second region, and in response to the first region and the second region not intersecting, grant the request for the exclusive or sharable lock on the second region.

14. The non-transitory electronic-device readable medium of claim 11, wherein the region-based lock on the first region is a sharable lock, the region-based lock on the second region is an exclusive lock, and the instructions operable to either deny or grant are operable to, in response to the first region and the second region intersecting, deny the request for the exclusive lock on the second region, and in response to the first region and the second region not intersecting, grant the request for the exclusive lock on the second region.

15. The non-transitory electronic-device readable medium of claim 11, wherein the region-based lock on the first region is a sharable lock, the region-based lock on the second region is a sharable lock, and the instructions operable to either deny or grant are operable to, in response to the first region and the second region intersecting, grant the request for the shareable lock on the second region, and in response to the first region and the second region not intersecting, grant the request for the sharable lock on the second region.

16. The non-transitory electronic-device readable medium of claim 11, wherein the instructions are further operable to:
permit the first client to write to the multi-dimensional spatial data within the first region based on a check to verify that the region-based lock on the first region has not expired.

17. The non-transitory electronic-device readable medium of claim 11, wherein the multi-dimensional spatial data is a three dimension (3-D) mesh.

18. The non-transitory electronic-device readable medium of claim 17, wherein the first client and the second client perform retouching, reconstruction, texturing or annotating operations upon the 3-D mesh.

* * * * *

UNITED STATES PATENT AND TRADEMARK OFFICE
CERTIFICATE OF CORRECTION

PATENT NO. : 11,017,594 B2
APPLICATION NO. : 16/440178
DATED : May 25, 2021
INVENTOR(S) : Elenie Godzaridis et al.

It is certified that error appears in the above-identified patent and that said Letters Patent is hereby corrected as shown below:

In the Specification

Column 4, Line 34 reads:
"have another numbers of dimensions and such dimensions"
Should read:
--have another number of dimensions and such dimensions--

Column 7, Line 37 should read:
"manner, so that a region is at least sharably locked whenever"
Should read:
--manner, so that a region is at least shareable locked whenever--

Signed and Sealed this
Twenty-eighth Day of May, 2024

Katherine Kelly Vidal
*Director of the United States Patent and Trademark Office*